United States Patent
Jung et al.

(10) Patent No.: US 11,455,837 B2
(45) Date of Patent: Sep. 27, 2022

(54) ADAPTIVE INFERENCE SYSTEM AND OPERATION METHOD THEREFOR

(71) Applicant: KOREA ELECTRONICS TECHNOLOGY INSTITUTE, Seongnam-si (KR)

(72) Inventors: Min Young Jung, Hwaseong-si (KR); Sa Im Shin, Seoul (KR); Jin Yea Jang, Suwon-si (KR); San Kim, Seongnam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 0 days.

(21) Appl. No.: 17/726,325

(22) Filed: Apr. 21, 2022

(65) Prior Publication Data

US 2022/0245970 A1    Aug. 4, 2022

Related U.S. Application Data

(63) Continuation of application No. PCT/KR2020/012303, filed on Sep. 11, 2020.

(30) Foreign Application Priority Data

Oct. 22, 2019    (KR) .................. 10-2019-0131597

(51) Int. Cl.
*G06K 9/00* (2022.01)
*G06V 40/70* (2022.01)
(Continued)

(52) U.S. Cl.
CPC ............ *G06V 40/70* (2022.01); *G06V 40/169* (2022.01); *G10L 15/22* (2013.01); *G10L 2015/223* (2013.01)

(58) Field of Classification Search
CPC ...... G06V 40/70; G06V 40/169; G10L 15/22; G10L 2015/223
(Continued)

(56) References Cited

U.S. PATENT DOCUMENTS 7,092,928 B1 *   8/2006   Elad ..................... G06F 16/958
                                                    706/45
2004/0204813 A1   10/2004  Doering
(Continued)

FOREIGN PATENT DOCUMENTS

KR    10-2008-0051479 A    6/2008
KR    10-2009-0053178 A    5/2009
(Continued)

OTHER PUBLICATIONS

International Search Report dated Dec. 8, 2020 in International Application No. PCT/KR2020/012303.
(Continued)

*Primary Examiner* — Charlotte M Baker
(74) *Attorney, Agent, or Firm* — Knobbe Martens Olson & Bear LLP

(57) ABSTRACT

This application relates to an adaptive inference system and an operation method therefor. In one aspect, the system includes a user terminal for collecting multi-modal information including at least visual information, voice information and text information. The system may also include an inference support device for receiving the multi-modal information from the user terminal, and inferring the intention of a user on the basis of pre-stored history information related to the user terminal, individualized information and the multi-modal information.

6 Claims, 3 Drawing Sheets

(51) Int. Cl.
*G06V 40/16* (2022.01)
*G10L 15/22* (2006.01)

(58) Field of Classification Search
USPC .......................................................... 382/116
See application file for complete search history.

(56) References Cited

U.S. PATENT DOCUMENTS

2007/0099602 A1   5/2007  Kurlander et al.
2021/0012065 A1*  1/2021  Shmuel .................. G06F 40/35

FOREIGN PATENT DOCUMENTS

| KR | 10-2011-0009614 A | 1/2011 |
| KR | 10-2018-0060328 A | 6/2018 |
| KR | 10-2018-0046649 A | 5/2019 |
| WO | WO 2013/169792 A1 | 11/2013 |

OTHER PUBLICATIONS

Office Action dated Mar. 29, 2021 in Korean Application No. 10-2019-0131597.
Notice of Allowance dated Oct. 27, 2021 in Korean Application No. 10-2019-0131597.

* cited by examiner

ADAPTIVE INFERENCE SYSTEM AND OPERATION METHOD THEREFOR

CROSS REFERENCE TO RELATED APPLICATIONS

This is a continuation application of International Patent Application No. PCT/KR2020/012303, filed on Sep. 11, 2020, which claims priority to Korean patent application No. KR 10-2019-0131597 filed on Oct. 22, 2019, contents of both of which are incorporated herein by reference in their entireties.

BACKGROUND

Technical Field

The present disclosure relates to adaptive inference and, more particularly, to an adaptive inference system, and an operating method thereof, capable of performing adaptive inference based on multi-modal information and history information.

Description of Related Technology

A multi-modal interface refers to a method of interfacing using voice, keyboard, pen, etc. for human-machine communication. When multi-modal information is input through such a multi-modal interface, methods for analyzing user intention include a method for merging and analyzing multi-modal inputs at the signal level, and a method for analyzing each modality input information and then merging the analyzed results at the semantic level.

SUMMARY

The present disclosure is intended to provide an adaptive inference system, and an operating method thereof, capable of more accurately inferring a user's current situation and status, based at least in part on multi-modal information including visual information, voice information, and text information as well as user history information and user personal information.

According to an embodiment of the present invention, an adaptive inference system may include a user terminal collecting multi-modal information including at least visual information, voice information, and text information; and an inference support apparatus receiving the multi-modal information from the user terminal and inferring a user's intention based on the multi-modal information and previously stored history information and individual information related to the user terminal.

The inference support apparatus may obtain a recognition result by performing recognition of at least one of object recognition, situation description, face recognition, emotion recognition, voice recognition, speaker recognition, and inference ground recognition, based on the multi-modal information.

According to an embodiment of the present invention, an inference support apparatus may include a server communication circuit establishing a communication channel with a user terminal; and a server processor functionally connected to the communication circuit and configured to receive multi-modal information including at least visual information, voice information, and text information from the user terminal, to derive an inference result by inferring a user's intention, based on the multi-modal information and previously stored history information and individual information related to the user terminal, and to store the inference result.

The server processor may be configured to update the history information, based on the inference result.

According to an embodiment of the present invention, a user terminal may include a communication circuit supporting transmission and reception of a message; an image sensor acquiring an image related to at least a part of a surrounding subject; a microphone collecting ambient audio signals; a memory storing history information and individual information related to a use of an inference function; and a processor configured to obtain multi-modal information including at least text information acquired through the message transmitted and received through the communication circuit, visual information including the image acquired by the image sensor, and voice information acquired by the microphone, to infer a user's intention, based on the history information and the individual information stored in the memory and the multi-modal information, and to store an inference result in the memory.

Based on the inference result, the processor may execute at least one application among preconfigured applications or terminate at least one application among currently running applications.

According to an embodiment of the present invention, an adaptive inference method may include receiving multi-modal information including at least visual information, voice information, and text information from a user terminal; obtaining history information and individual information previously stored in relation to the user terminal; inferring a user's intention, based on the history information, the individual information, and the multi-modal information; and storing an inference result.

The method may further include obtaining a recognition result by performing recognition of at least one of object recognition, situation description, face recognition, emotion recognition, voice recognition, speaker recognition, and inference ground recognition, based on the multi-modal information.

According to the present invention, the adaptive inference system and the operating method thereof can enable various inferences based on various kinds of multi-modal information.

In addition, the present disclosure can enable more accurate situation inference by using not only user context information about the current time, but also history information.

In addition, the present disclosure can support a more personalized inference function based on individual personal information including user information and history information.

DETAILED DESCRIPTION

The signal level merging method is to merge multi-modal input signals and analyze and classify them at once, and can be suitably used for processing signals that occur at the same time, such as, for example, a voice signal and a lip movement. However, because the signal level merging method integrates and processes two or more signals, a feature space is very large, a model for calculating a correlation between signals is very complex, and the amount of learning is increased. In addition, the signal level merging method is poor in expansion such as when combined with other modalities or applied to other terminals.

On the other hand, the merging method at each modality semantic level is to analyze the meaning of each modality input signal and then merge the analysis results, and it is possible to maintain independence between modalities, which facilitates learning and expansion. However, a reason that the user performs a multi-modal input is because there is a correlation between modalities, and a case of individually analyzing the meaning may cause a problem that it is difficult to find this correlation.

In the following description, only parts necessary to understand embodiments of the present disclosure will be described, and other parts will not be described to avoid obscuring the subject matter of the present invention.

Terms used herein should not be construed as being limited to their usual or dictionary meanings. In view of the fact that the inventor can appropriately define the meanings of terms in order to describe his/her own disclosure in the best way, the terms should be interpreted as meanings consistent with the technical idea of the present invention. In addition, the following description and corresponding drawings merely relate to specific embodiments of the present disclosure and do not represent all the subject matter of the present invention. Therefore, it will be understood that there are various equivalents and modifications of the disclosed embodiments at the time of the present application.

Now, embodiments of the present disclosure will be described in detail with reference to the accompanying drawings.

Figure 1:
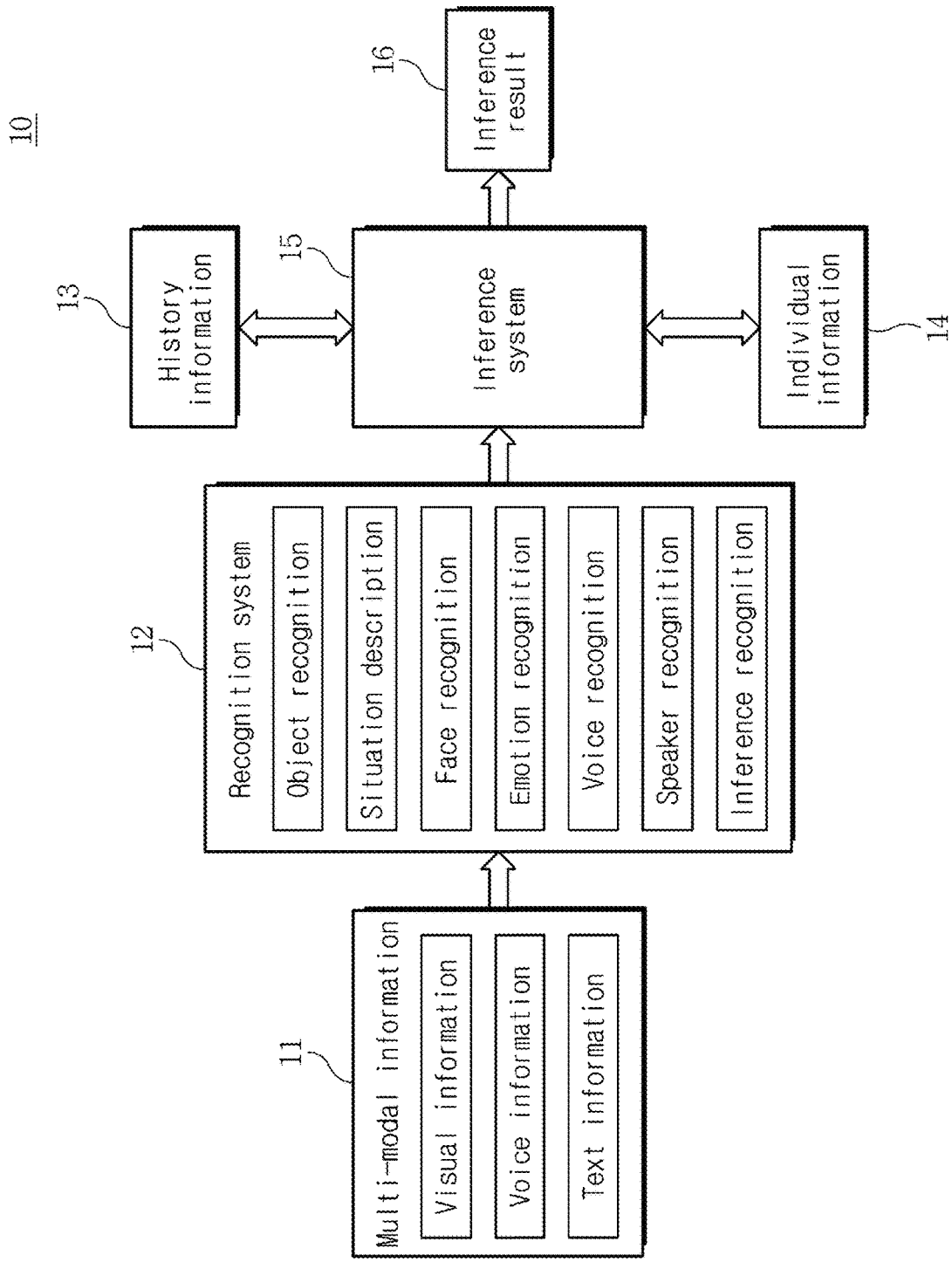
FIG. 1 is a diagram illustrating an exemplary configuration of an adaptive inference system according to an embodiment of the present invention.

FIG. 1 is a diagram illustrating an exemplary configuration of an adaptive inference system according to an embodiment of the present invention.

Referring to FIG. 1, the adaptive inference system 10 according to an embodiment of the present disclosure may include a multi-modal information module 11, a recognition system 12, a history information storage 13, an individual information storage 14, an inference system 15, and an inference result storage 16.

The multi-modal information module 11 may include a plurality of multi-modal sensors. For example, the plurality of multi-modal sensors may include an inertial sensor for detecting motion information, a geomagnetic sensor for detecting an orientation, an acceleration sensor or a gyro sensor for detecting a movement. In addition, the plurality of multi-modal sensors may include an image sensor and an acoustic sensor. The image sensor is, for example, a camera, and may acquire an image of a surrounding subject as visual information. The acoustic sensor may include at least one microphone and may collect voice information based on the at least one microphone. The multi-modal information module 11 may detect a movement of at least a part of the user's body based on sensor signals collected by the plurality of multi-modal sensors. The multi-modal information module 11 may collect at least user-related visual information, voice information, and text information. In relation to text information collection, the multi-modal information module 11 may collect text information inputted based on an electromagnetic induction panel and an electronic pen or text information inputted through a touch key or a touch screen equipped with a touch sensor. In addition, the multi-modal information module 11 may collect text information contained in a message transmitted/received through a communication network under the execution of a messenger function. The multi-modal information module 11 may provide the collected visual information, voice information, and text information to the recognition system 12.

The recognition system 12 may perform at least one of object recognition, situation description, face recognition, emotion recognition, voice recognition, speaker recognition, and inference ground recognition, based at least on visual information, voice information, and text information provided by the multi-modal information module 11. In addition, the recognition system 12 may further perform various types of recognition such as gesture recognition and behavior recognition. The recognition system 12 may perform object recognition for a human and a thing, based on the visual information. The recognition system 12 may receive the visual information (or image information), convert the description of the visual information into text, and thereby perform situational recognition of the current situation (or acquire situational description information). The recognition system 12 may perform user identification by recognizing a user's face based on the visual information. The recognition system 12 may recognize a user's emotion based on visual/voice/text information. The recognition system 12 may convert the voice information into text and recognize the converted text as speech. The recognition system 12 may perform user recognition by analyzing the voice information and identifying a user's voice. The recognition system 12 may perform inference ground recognition by inferring the voice information or the text information and extracting only necessary information (information for which the user determines the necessity according to a predetermined rule). The recognition system 12 may include respective recognition databases in relation to object recognition, situation description, face recognition, emotion recognition, voice recognition, speaker recognition, and inference ground recognition. The recognition database may include at least one of an algorithm, a model, and comparison data for each recognition.

The history information storage 13 may store history information including information recognized through multi-modal information provided by a user terminal in the past and inference results calculated based on the recognition information. From the history information, it is possible to identify what inference results were derived for past information that is at least partially similar or identical to the current situation, and the identified inference results may be applied as a weighting factor of the current inference or as a part of the inference. As such, adding the past inference results to the current inference results allows more accurate inference. Additionally, the history information storage 13 may store user's reaction information to a user function provided based on the past inference result. The reliability of the past inference result for the corresponding past information may be determined according to the user's reaction information, and the size of weight for applying the past history information to the current situation may be differently determined according to the determined reliability.

The individual information storage 14 may store user identification information obtained through face recognition/speaker recognition. In addition, the individual information storage 14 may store facial feature point information for a specific individual so that information about the specific individual can be found. The individual information stored in the individual information storage 14 may include personal preferences and personal information. Also, the individual information storage 14 may store face similarity classification information according to face recognition. The history information stored in the history information storage 13 and the individual information stored in the individual information storage 14 may be continuously added/changed when current information different from the past is generated.

The inference system 15 may infer a user's intention for the current situation, based on the recognition result provided by the recognition system, the history information provided by the history information storage 13, and the individual information stored in the individual information storage 14. For example, in a situation where a specific user is using a specific application in a user terminal, the inference system 15 may predict and determine the user's intention regarding which function of the corresponding application is to be executed, based on the face or emotion recognition, voice recognition, and text recognition of the user using the corresponding application. After predicting the user's intention by using at least the user's visual information, voice information, and text, the inference system 15 may map the prediction result to a user terminal function actually performed and thereby determine the accuracy of inference with respect to the prediction of user's intention. The inference system 15 may store the determined result, the used information, and a function used by the user terminal in the inference result storage 16. Among the information stored in the inference result storage 16, at least some information to which a user function recommendation or automatic execution is applied according to an actual inference result may be moved to and stored in the history information storage 13.

As described hereinbefore, the adaptive inference system 15 of the present disclosure may perform the inference of various current situations and statuses by using inputted multi-modal information (e.g., visual information from a camera, voice information from a microphone, text information from a messenger. In particular, the adaptive inference system 15 of the present disclosure may perform a more accurate and personalized inference process by performing the inference based on the multi-modal information together with the history information recording information that has been recognized in the past and the individual information recording personal/history information for each user. Through this process, the adaptive inference system 15 may finally obtain an inference result and provide the inference result as a ground for determining a user situation (e.g., a conversation service providing situation).

Figure 2:
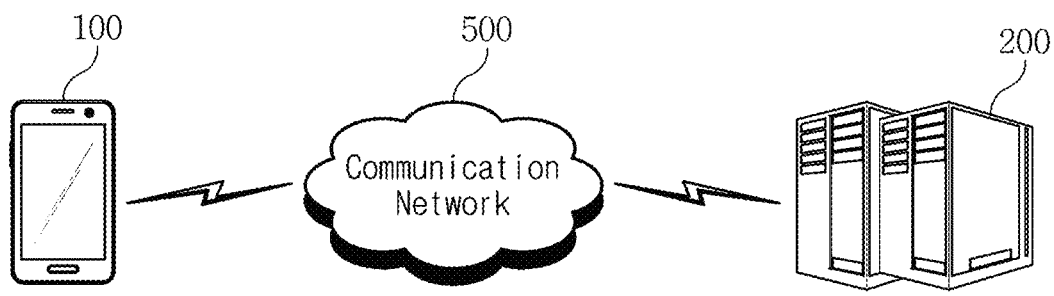
FIG. 2 is a diagram illustrating an exemplary network configuration for constructing an adaptive inference system according to an embodiment of the present invention.

FIG. 2 is a diagram illustrating an exemplary network configuration for constructing an adaptive inference system according to an embodiment of the present invention.

Referring to FIG. 2, the network configuration included in the adaptive inference system according to an embodiment of the present disclosure may include a user terminal 100, a communication network 500, and an inference support apparatus 200.

The communication network 500 may establish a communication channel between the user terminal 100 and the inference support apparatus 200. The communication network 500 may have various forms. For example, the communication network 500 collectively refers to a closed network such as a local area network (LAN) or a wide area network (WAN), an open network such as the Internet, a network based on code division multiple access (CDMA), wideband CDMA (WCDMA), global system for mobile communications (GSM), long term evolution (LTE), or evolved packet core (EPC), next-generation networks to be implemented in the future, and computing networks. In addition, the communication network 500 of the present disclosure may be configured to include, for example, a plurality of access networks (not shown), a core network (not shown), and an external network such as the Internet (not shown). The access network (not shown) performs wired/wireless communication through a mobile communication terminal device and may be implemented with, for example, a plurality of base stations and a base station controller. The base station (BS) may include a base transceiver station (BTS), a NodeB, an eNodeB, etc., and the base station controller (BSC) may include a radio network controller (RNC) or the like. In addition, a digital signal processing unit and a radio signal processing unit, which are integrally implemented in the base station, may be separately implemented as a digital unit (DU) and a radio unit (RU), respectively. A plurality of RUs (not shown) may be installed in a plurality of areas, respectively, and connected to a centralized DU (not shown).

In addition, the core network (not shown) constituting the mobile network together with the access network (not shown) connects the access network (not shown) and an external network, for example, the Internet (not shown). The core network (not shown), which is a network system performing main functions for a mobile communication service such as mobility control and switching between access networks (not shown), performs circuit switching or packet switching and manages and controls a packet flow in the mobile network. In addition, the core network (not shown) manages inter-frequency mobility, controls traffic in the access network (not shown) and the core network (not shown), and performs a function of interworking with other networks, for example, the Internet (not shown). The core network (not shown) may be configured to further include a serving gateway (SGW), a PDN gateway (PGW), a mobile switching center (MSC), a home location register (HLR), a mobile mobility entity (MME), and a home subscriber server (HSS). In addition, the Internet (not shown), which is a public network for exchanging information in accordance with TCP/IP protocol, is connected to the user terminal 100 and the inference support apparatus 200, and is capable of transmitting information provided from the inference support apparatus 200 to the user terminal 100 through the core network (not shown) and the access network (not shown). Also, the Internet is capable of transmitting various kinds of information received from the user terminal device 100 to the inference support apparatus 200 through the access network (not shown) and the core network (not shown).

The user terminal 100 may be connected to the inference support apparatus 200 through the communication network 500. The user terminal 100 according to an embodiment of the present disclosure may be in general a mobile communication terminal device, which may include a network device capable of accessing the communication network 500 provided in the present disclosure and then transmitting and receiving various data. The user terminal 100 may also be referred to as a terminal, a user equipment (UE), a mobile station (MS), a mobile subscriber station (MSS), a subscriber station (SS), an advanced mobile station (AMS), a wireless terminal (WT), a device-to-device (D2D) device, or the like. However, the user terminal 100 of the present disclosure is not limited to the above terms, and any apparatus connected to the communication network 500 and capable of transmitting/receiving data may be used as the user terminal 100 of the present invention. The user terminal 100 may provide multi-modal information to the inference support apparatus 200 through the communication network 500. In this regard, the user terminal 100 may include a memory for storing a browser, a program, and a protocol, and a processor for executing, operating, and controlling various programs. The user terminal 100 may be implemented in various forms and may include a mobile terminal to which a wireless communication technology is applied, such as a smart phone, a tablet PC, a PDA, or a potable multimedia player (PMP). In particular, the user terminal 100 of the present disclosure is capable of transmitting multi-modal information and individual personal information to the inference support apparatus 200 through the communication network 500, and also receiving and outputting an inference result or application operation data based on the inference result from the inference support apparatus 200. The user terminal 100 may include the multi-modal information module 11 among components of the adaptive inference system 10 shown in FIG. 1 above.

The inference support apparatus 200 may perform inference, based on the multi-modal information received from the user terminal 100, pre-stored history information related to the user terminal 100, and personal information related to the user terminal 100, and then store an inference result. The inference support apparatus 200 may provide, based on the stored inference result, data on the operation of at least one of applications installed in the user terminal 100 or provide a control signal, thereby providing feedback information on the use of the user terminal 100 or supporting automatic execution of a specific function related to the user terminal 100. The inference support apparatus 200 may be a web application server (WAS), Internet information server (IIS), or a well-known web server using Apache Tomcat or Nginx on the Internet. In addition, one of devices constituting the network computing environment may be the inference support apparatus 200 according to an embodiment of the present invention. In addition, the inference support apparatus 200 may support an operating system (OS) such as Linux or Windows and execute received control commands. In terms of software, program modules implemented through a language such as C, C++, Java, Visual Basic, or Visual C may be included. The inference support apparatus 200 may include the recognition system 12, the inference system 15, the history information storage 13, the personal information storage 14, and the inference result storage 16, among components of the adaptive inference system 10 described above in FIG. 1. Also, in relation to obtaining and operating the inference result, the inference support apparatus 200 may include a server communication circuit for establishing a communication channel with the user terminal 100, and a server processor functionally connected to the server communication circuit. The server processor may perform operations for deriving and operating the above-described inference result. Further, the inference support apparatus 200 may include a server memory that is functionally connected to the server processor, stores the history information and the individual information, and stores the inference result.

Meanwhile, although it is described above that the inference support apparatus 200 receives multi-modal information from the user terminal 100 through the communication network 500 and performs inference using the pre-stored history information and individual information, the present disclosure is not limited thereto. For example, the adaptive inference system 15 described in FIG. 1 may be included in the user terminal 100. Hereinafter, an embodiment in which the adaptive inference system 15 is included in the user terminal 100 will be described with reference to FIGS. 3 and 4.

Figure 3:
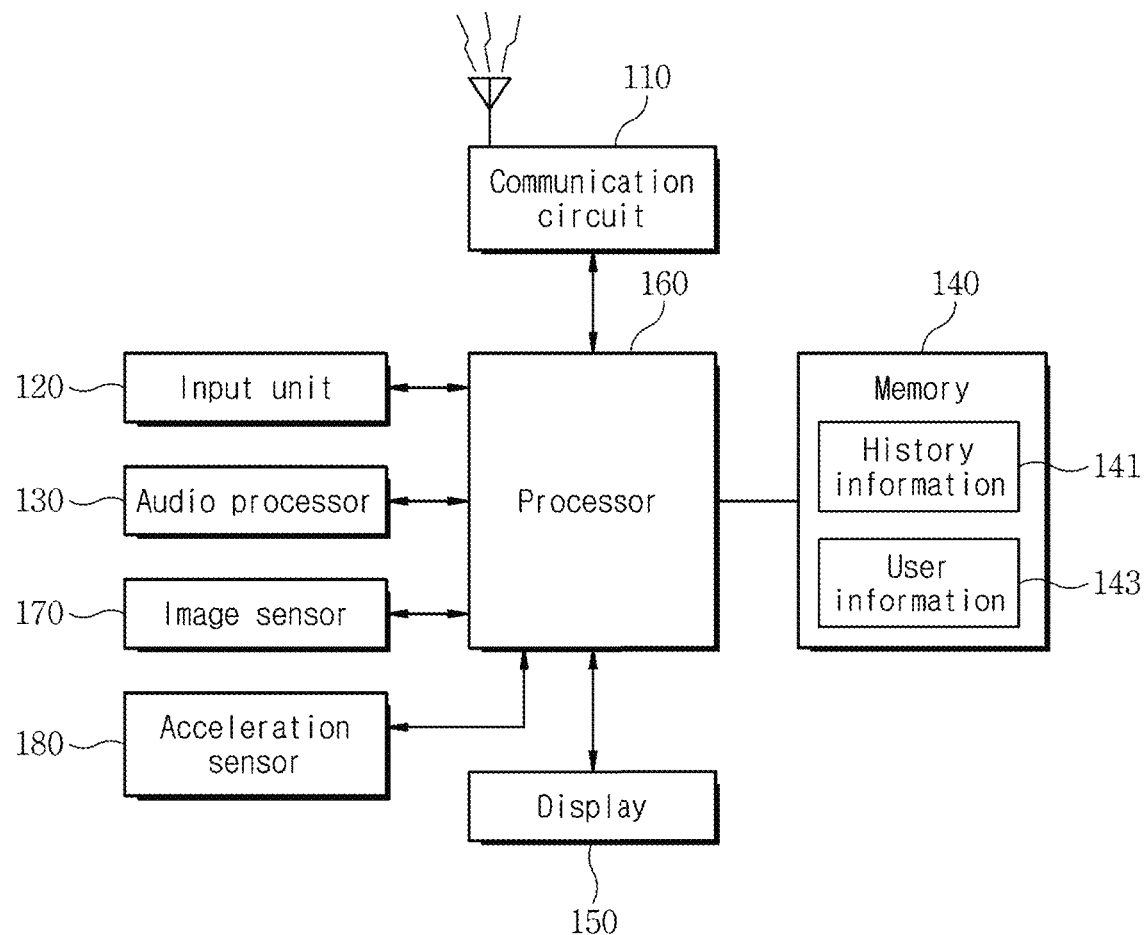
FIG. 3 is a diagram illustrating an exemplary configuration of a user terminal in the configuration of an adaptive inference system according to an embodiment of the present invention.

FIG. 3 is a diagram illustrating an exemplary configuration of a user terminal in the configuration of an adaptive inference system according to an embodiment of the present invention.

Referring to FIG. 3, the user terminal 100 according to an embodiment of the present disclosure may include a communication circuit 110, an input unit 120, an audio processor 130, a memory 140, a display 150, an image sensor 170, an acceleration sensor 180, and a processor 160. In addition, the user terminal 100 may further include a speaker, a lamp, a vibration module, etc. for outputting information.

The communication circuit 110 may establish a communication channel of the user terminal 100. For example, the communication circuit 110 may establish a communication channel with the communication network 500 based on at least one of communication schemes of various generations such as 3G, 4G, and 5G. The communication circuit 110 may establish a communication channel with the inference support apparatus 200 under the control of the processor 160 and transmit multi-modal information to the inference support apparatus 200.

The input unit 120 may support an input function of the user terminal 100. The input unit 120 may include at least one of a physical key(s), a touch key, a touch screen, and an electronic pen. The input unit 120 may generate an input signal based on a user's manipulation and provide the generated input signal to the processor 160. For example, the input unit 120 may receive a user's request for execution of an application related to collection of multi-modal information and provide an input signal corresponding to the user's request to the processor 160.

The audio processor 130 may process audio input/output of the user terminal 100. For example, the audio processor 130 may include a speaker for outputting an audio signal related to the operation of the user terminal 100 and a microphone for collecting an ambient audio signal or a user's voice. In particular, the audio processor 130 may collect user's voice information and provide it to the inference support apparatus 200 under the control of the processor 160.

The memory 140 may store at least one data related to the operation of the user terminal 100. For example, the memory 140 may store an application related to the operation of multi-modal information. The memory 140 may store individual information or user information 143 related to the user of the user terminal 100. In addition, the memory 140 may store history information 141 previously used in connection with the operation of an inference function of the user terminal 100. Such information stored in the memory 140 may be provided to the inference support apparatus 200 at the request of the inference support apparatus 200 and user's confirmation.

The display 150 may output at least one screen related to the operation of the user terminal 100 of the present invention. For example, the display 150 may output a screen according to execution of at least one application related to the use of multi-modal information. The display 150 may output a screen related to access to the inference support apparatus 200 and a screen related to operation of an inference function provided by the inference support apparatus 200. The display 150 may output information for guiding multi-modal information collection.

The image sensor 170 may include a camera. The image sensor 170 may be activated in association with the multi-modal information collection and may collect surrounding images. For example, the image sensor 170 may collect images of at least a portion of a subject existing around the current position of the user terminal 100, such as a user's face, a user's body, a surrounding environment, or a background. The image collected by the image sensor 170 may be provided to the inference support apparatus 200 as visual information.

The acceleration sensor 180 may collect sensing information related to the movement of the user terminal 100. The user terminal 100 may further include a geomagnetic sensor or a gyro sensor in addition to the acceleration sensor 180. The sensing information collected by the acceleration sensor 180 may be provided to the inference support apparatus 200 as information related to a user's movement.

The processor 160 may transmit and process various signals related to the operation of the user terminal 100. For example, the processor 160 may execute an application related to the use of multi-modal information in response to a user input. In relation to multi-modal information collection, the processor 160 may activate at least one sensor (e.g., the image sensor 170), the microphone of the audio processing unit 130, or the communication circuit 110 and collect visual information, voice information, and text information may be collected at the current position and time. The processor 160 may transmit the collected multi-modal information including at least visual information, voice information, and text to the inference support apparatus 200, receive an inference result corresponding to the multi-modal information from the inference support apparatus 200, and output the inference result or execute an application related to the inference result.

In case of receiving the inference result from the inference support apparatus 200 in the process of executing the application related to the use of multi-modal information, the processor 160 may store the received inference result as the history information. In this case, the processor 160 may map the inference result with the transmitted multi-modal information and store them. The processor 160 may collect individual information according to a user input. Also, the processor 160 may output a screen to input the individual information in the process of purchasing or setting the user terminal 100, and store and manage the inputted individual information in the memory 140. Also, the processor 160 may receive the individual information from another terminal used by the user and store it. The processor 160 may transmit the individual information to the inference support apparatus 200 at the request of the inference support apparatus 200.

Meanwhile, although it is described hereinbefore that the user terminal 100 accesses the inference support apparatus 200 through the communication network 500, provides the multi-modal information to the inference support apparatus 200, and receive and output the corresponding inference result, the present disclosure is not limited thereto. For example, the adaptive inference system according to an embodiment of the present disclosure may be entirely implemented in the user terminal 100. Specifically, the image sensor 130, the communication circuit 110, and the microphone of the audio processor 130 included in the user terminal 100 correspond to the multi-modal information module 11 shown in FIG. 1 and may collect at least visual information, voice information, and text information. The image sensor 170 and the input unit 120 of the user terminal 100 may additionally collect user inputs, and the acceleration sensor 180 or the like may collect sensing information on a user motion. The memory 140 of the user terminal 100 may include the history information storage 13, the individual information storage 14, and the inference result storage 16 described with reference to FIG. 1. Accordingly, the memory 140 may store the history information caused by the use of inference function data and also store the individual information caused by a user input. Also, the memory 140 may store the inference result. The processor 160 of the user terminal 100 may support the functions of the recognition system 12 and the inference system 15. For example, the processor 160 may perform at least one of object recognition, situation description, face recognition, emotion recognition, voice recognition, speaker recognition, and inference ground recognition from at least visual information, voice information, and text information. The processor 160 may infer the user's intention, based on the history information and individual information stored in the memory 140 together with the recognition result. The processor 160 may operate at least one inference algorithm for inference. The inference algorithm may be designed to calculate an inference result by inferring a user's intention based on the multi-modal information, the history information, and the individual information, and to output specific information or execute a specific application according to the inference result. In this regard, the processor 160 of the user terminal 100 may include the configuration shown in FIG. 4.

Figure 4:
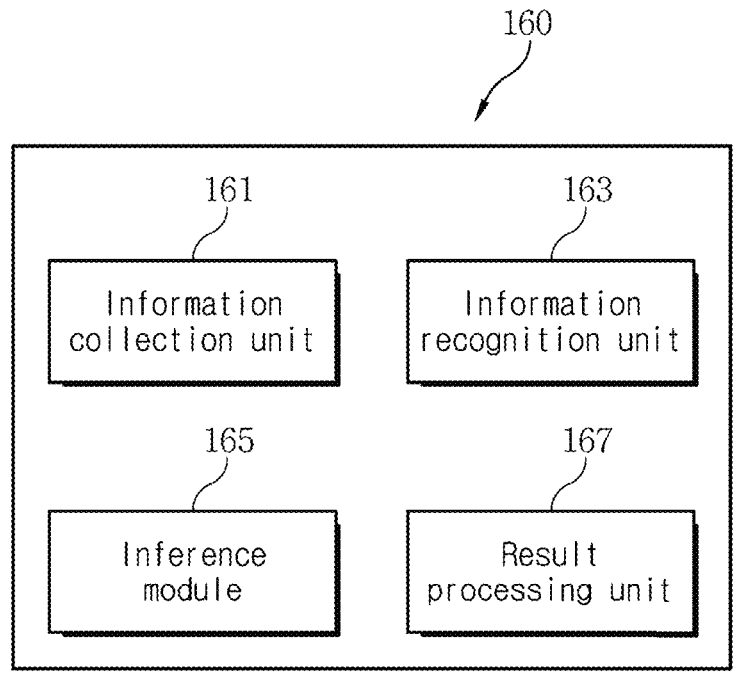
FIG. 4 is a diagram illustrating an exemplary configuration of a processor of a user terminal according to an embodiment of the present invention.

FIG. 4 is a diagram illustrating an exemplary configuration of a processor of a user terminal according to an embodiment of the present invention.

Referring to FIG. 4, the processor 160 of the user terminal 100 may include an information collection unit 161, an information recognition unit 163, an inference module 165, and a result processing unit 167.

The information collection unit 161 may activate at least one sensor or at least one device component in connection with the operation of an inference function. For example, the information collection unit 161 may activate the image sensor 170, the microphone of the audio processor 130, and the communication circuit 110, and collect at least visual information, voice information, and transmitted/received text information. In addition, by using the acceleration sensor 180, the input unit 120, and the like, the information collection unit 161 may further collect additional information related to the user who uses the user terminal 100.

The information recognition unit 163 may receive at least the visual information, the voice information, and the text information from the information collection unit 161, and perform information recognition based on the received information. For example, the information recognition unit 163 may perform at least one of object recognition, face recognition, emotion recognition, and situation description from the visual information. Also, the information recognition unit 163 may perform at least one of voice recognition, emotion recognition, speaker recognition, and inference ground recognition from the voice information. Also, the information recognition unit 163 may perform at least one of emotion recognition and inference ground recognition from the text information.

The inference module 165 may infer a user's intention based on the recognized information. For example, the inference module 165 may identify a user's current emotion based on the recognized information, identify an emotional state and a current time, and then determine the user's intention corresponding to the identified emotional state and time. For example, when the user says "Play music", the inference module 165 may recognize voice information and at the same time recognize the user's emotions through visual information, and then play music that matches the user's current emotion. Upon deriving the inference result corresponding to the user's intention, the inference module 165 may provide the derived inference result to the result processing unit 167.

The result processing unit 167 may process the operation of a user function according to the inference result. For example, the result processing unit 167 may execute a music play application according to the inference result (e.g., the result of determining that the user intends to listen to music) and then control the application to play music of a specific genre. Also, the result processing unit 167 may extract at least one phone number according to the inference result (e.g., the result of determining that the user needs a call connection with an acquaintance) and then recommend a call connection using the extracted phone number. Also, the result processing unit 167 may determine a user's current location according to the inference result (e.g., the result of determining that the user needs food), search for nearby restaurants, and then recommend a specific restaurant through restaurant filtering based on user's individual information or history information. Also, the result processing unit 167 may propose to pause a currently executing application (e.g., a game) according to the inference result (e.g., the result of determining that the user needs exercise) and automatically execute an exercise application. The result processing unit 167 may suggest to the user to execute a function according to the inference result, check feedback such as whether the suggested function is executed or rejected, and calculate the reliability of the inference result. The reliability calculated by the result processing unit 167 may be later determined as the reliability of the history information and may also be used as a weight in the next inference process.

Figure 5:
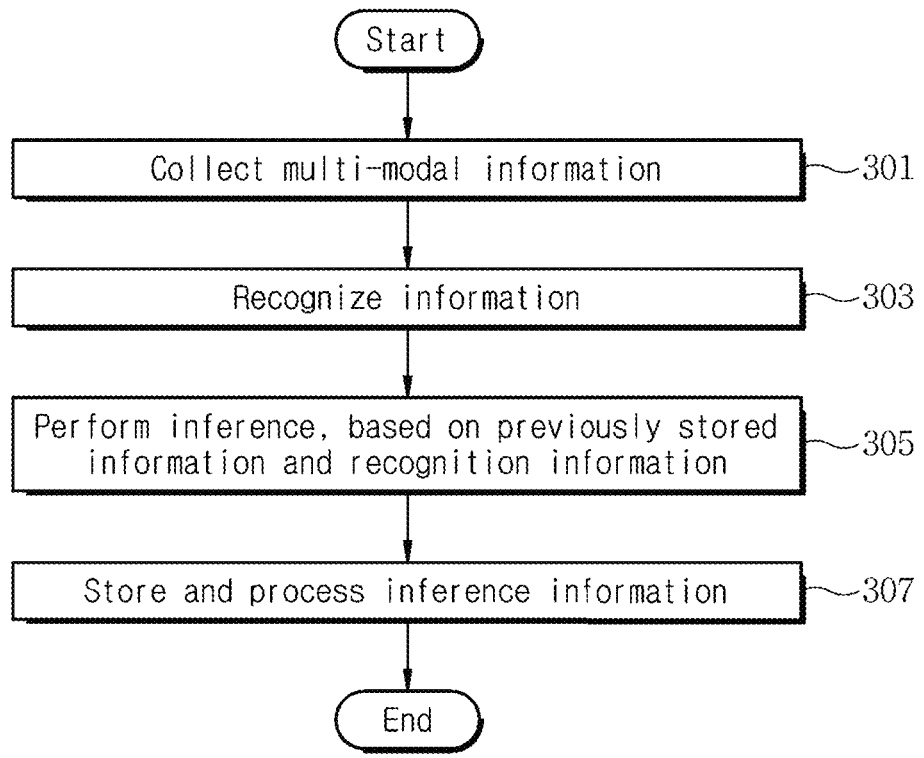
FIG. 5 is a diagram illustrating an exemplary adaptive inference method according to an embodiment of the present invention.

FIG. 5 is a diagram illustrating an exemplary adaptive inference method according to an embodiment of the present invention.

Referring to FIG. 5, in the adaptive inference method according to an embodiment of the present invention, the processor 160 (or the inference support apparatus 200) of the user terminal 100 may collect multi-modal information at step 301. For example, the processor 160 may collect multi-modal information including at least visual information, voice information, and text information.

At step 303, the processor 160 may perform information recognition. For example, the processor 160 may perform information recognition including at least one of object recognition, situation description, face recognition, emotion recognition, voice recognition, speaker recognition, and inference ground recognition, based on the multi-modal information.

At step 305, the processor 160 may perform inference, based on previously stored information and recognition information. For example, the processor 160 may perform an inference process, based on previously stored individual information and recognition information. Alternatively, the processor 160 may perform an inference process, based on previously stored history information and recognition information. Alternatively, the processor 160 may perform an inference process, based on previously stored individual information, previously stored history information, and recognition information.

At step 307, the processor 160 may store and process inference information. For example, the processor 160 may store an inference result in the memory 140. Based on the inference result, the processor 160 may execute at least one application installed in the user terminal 100 and suggest the operation of at least one function during the operation of the executed application. Alternatively, the processor 160 may terminate or propose to terminate at least one application currently being executed.

While the present disclosure has been particularly shown and described with reference to an exemplary embodiment thereof, it will be understood by those skilled in the art that various changes in form and details may be made therein without departing from the scope of the present disclosure as defined by the appended claims.

What is claimed is:

1. An adaptive inference system comprising:
   a user terminal configured to collect multi-modal information including at least visual information, voice information, and text information; and
   an inference support apparatus configured to receive the multi-modal information from the user terminal and infer an intention of a user based on the multi-modal information and previously stored history information and individual information related to the user terminal,
   wherein the inference support apparatus is configured to store reaction information of the user to a user function provided based on a past inference result, determines reliability of the past inference result for corresponding past information according to the reaction information of the user, and according to the determined reliability, differently determine a size of weight for applying the past history information to a current situation.

2. The adaptive inference system of claim 1, wherein the inference support apparatus obtains a recognition result by performing recognition of at least one of object recognition, situation description, face recognition, emotion recognition, voice recognition, speaker recognition, or inference ground recognition, based on the multi-modal information.

3. An inference support apparatus comprising:
   a server communication circuit configured to establish a communication channel with a user terminal; and
   a server processor functionally connected to the communication circuit and configured to:
   receive multi-modal information including at least visual information, voice information, and text information from the user terminal,
   derive an inference result by inferring an intention of a user, based on the multi-modal information and previously stored history information and individual information related to the user terminal, and
   store the inference result,
   wherein the server processor is configured to store reaction information of the user to a user function provided based on a past inference result, determine reliability of the past inference result for corresponding past information according to the reaction information of the user, and according to the determined reliability, differently determine a size of weight for applying the past history information to a current situation.

4. The inference support apparatus of claim 3, wherein the server processor is configured to update the history information, based on the inference result.

5. An adaptive inference method comprising:
receiving multi-modal information including at least visual information, voice information, and text information from a user terminal;
obtaining history information and individual information previously stored in relation to the user terminal;
inferring an intention of a user, based on the history information, the individual information, and the multi-modal information;
storing an inference result;
storing reaction information of the user to a user function provided based on a past inference result;
determining reliability of the past inference result for corresponding past information according to the reaction information of the user; and
according to the determined reliability, differently determining a size of weight for applying the past history information to a current situation.

6. The adaptive inference method of claim 5, further comprising:
obtaining a recognition result by performing recognition of at least one of object recognition, situation description, face recognition, emotion recognition, voice recognition, speaker recognition, or inference ground recognition, based on the multi-modal information.

\* \* \* \* \*